United States Patent [19]

Okawa et al.

[11] Patent Number: 5,223,596
[45] Date of Patent: Jun. 29, 1993

[54] DIPHENYSILOXANE-DIMETHYLSIOXANE COPOLYMER AND METHOD FOR THE PREPARATION THEREOF

[75] Inventors: Tadashi Okawa; Shuji Yamada, both of Chiba, Japan

[73] Assignee: Dow Corning Toray Silicone Co., Ltd., Tokyo, Japan

[21] Appl. No.: 919,516

[22] Filed: Jul. 24, 1992

[30] Foreign Application Priority Data

Jul. 31, 1991 [JP] Japan .................. 3-214735

[51] Int. Cl.⁵ .............................. C08G 77/06
[52] U.S. Cl. ..................... 528/15; 528/37; 525/477; 525/478; 525/479
[58] Field of Search ............. 528/15, 37; 525/477, 525/478, 479

[56] References Cited

U.S. PATENT DOCUMENTS 5,169,920 12/1992 Okawa .................. 528/37

FOREIGN PATENT DOCUMENTS 455163 11/1991 European Pat. Off. .

*Primary Examiner*—Melvyn I. Marquis
*Attorney, Agent, or Firm*—Robert L. McKellar

[57] ABSTRACT

A diphenylsiloxane-dimethylsiloxane copolymer that contains at least one organofunctional group at its molecular chain terminals, wherein said organofunctional group is bonded to the silicon atom across a divalent organic group and wherein said organofunctional group is selected from the set comprising the amino group, epoxy group, carboxyl group, and hydroxyl group and a method for the preparation of the copolymer.

2 Claims, 2 Drawing Sheets

(CM-1)

(CM-1)

(CM-1)

(CM-1)

DIPHENYSILOXANE-DIMETHYLSIOXANE COPOLYMER AND METHOD FOR THE PREPARATION THEREOF

DETAILED DESCRIPTION OF THE INVENTION

Technical Field

The present invention relates to diphenylsiloxane-dimethylsiloxane copolymers and to a method for the preparation of the same. More specifically, the present invention relates to diphenylsiloxane-dimethylsiloxane copolymers that contain at least one organofunctional group at its molecular chain terminals, wherein said organofunctional group is bonded to the silicon atom across a divalent organic group and wherein said organofunctional group is selected from the group comprising the amino group, epoxy group, carboxyl group, and hydroxyl group. The present invention also relates to a method for the preparation of said diphenylsiloxane-dimethylsiloxane copolymers.

Prior Art

Organopolysiloxanes containing organofunctional groups are employed as modifiers of organic resins in order to impart thereto the properties associated with organopolysiloxanes, for example, weathering resistance, surface water repellency, lubrication, biocompatibility, gas permeability, and the like.

Organofunctionalorganopolysiloxanes are known, for example, in the form of amino-modified organopolysiloxanes, epoxy-modified organopolysiloxanes, methacryloxy-modified organopolysiloxanes, carbinol-modified organopolysiloxanes, and carboxyl-modified organopolysiloxanes. These organofunctionalorganopolysiloxanes are generally prepared by an addition reaction between the corresponding ≡SiH-containing organopolysiloxanes and aliphatically unsaturated compounds containing the organofunctional group. In addition, these prior art organopolysiloxanes have generally been dimethylpolysiloxanes.

The introduction of the diphenylsiloxane unit into dimethylpolysiloxanes in order to improve the properties of dimethylpolysiloxanes for example, radiation resistance, heat resistance, noncombustibility, low-temperature flexibility, compatibility with organic resin is well-known. Accordingly, one would naturally expect that organofunctionaldiphenylsiloxane-dimethylsiloxane copolymers would be ideal modifiers for organic resins. However, such diphenylsiloxane-dimethylsiloxane copolymers have heretofore remained unknown due to the problems associated with the preparation of the ≡SiH-containing diphenylsiloxane-dimethylsiloxane copolymers from which the organofunctionaldiphenylsiloxane-dimethylsiloxane copolymers are synthesized. The problem is that scission occurs at the silicon-phenyl bond when an acid catalyst is employed as the polymerization catalyst for the ≡SiH-containing diphenylsiloxane-dimethylsiloxane copolymer, while scission occurs at the silicon-hydrogen bond when a basic catalyst is used.

The present inventors earlier proposed a method for the preparation of diphenylsiloxane-dimethylsiloxane copolymers in Japanese Patent Application Number 2-114177/65. However, the diphenylsiloxane-dimethylsiloxane copolymers proposed in that Japanese Patent Application has silanol groups located at the molecular chain terminals, and therefore is not an organofunctional copolymer.

Problems to Be Solved by the Invention

The present invention presents as its object diphenylsiloxane-dimethylsiloxane copolymers that contain at least one organofunctional group at the molecular chain terminals, wherein said organofunctional group is bonded to the silicon atom with a divalent organic group and wherein said organofunctional group is selected from the group comprising the amino group, epoxy group, carboxyl group, and hydroxyl group. A further object of the present invention is the introduction of a method for the preparation of said diphenylsiloxane-dimethylsiloxane copolymers.

In one embodiment, the present invention relates to diphenylsiloxane-dimethylsiloxane copolymers having the following general formula:

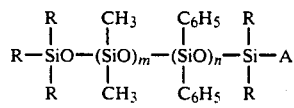

wherein R is a monovalent hydrocarbon group; A is an organofunctional group selected from the group comprising the aminoalkyl, epoxy, carboxyl and hydroxyl groups, wherein such groups are bonded to silicon atoms through a divalent organic radical; m and n are both positive numbers such that they give a number-average molecular weight for the copolymers in the range of 500 to 100,000.

A second embodiment of this invention are copolymers with the following general formula:

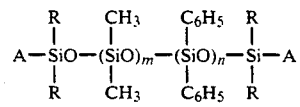

wherein R is a monovalent hydrocarbon group; A is an organofunctional group selected from the group comprising the aminoalkyl, epoxy, carboxyl and hydroxyl groups, wherein such groups are bonded to silicon atoms through a divalent organic radical; m and n are both positive numbers such that they give a number-average molecular weight for the copolymers in the range of 500 to 100,000.

Yet a third embodiment is a method for the preparation of diphenylsiloxane-dimethylsiloxane copolymers wherein said method consists of:

A method for the preparation of the diphenylsiloxane-methylsiloxane copolymers of claim 1 wherein said method comprises (I) contacting a polymerization initiator (i) with (ii) a mixture of hexamethylcyclotrisiloxane and hexaphenylcyclotrisiloxane in an aprotic organic solvent to form a first copolymer;

(II) contacting the copolymer from (I) with a (iii) a diorganohydridohalosilane to form a silicon hydride-modified copolymer;

(III) reacting the modified copolymer from (II) with (iv) an aliphatically unsaturated compound that contains an organofunctional group selected from the group comprising the aminoalkyl, epoxy, carboxyl and hydroxyl groups in the presence of a hydrosilylation catalyst, and (IV) recovering the diphenylsiloxane-methylsiloxane copolymers.

The diphenylsiloxane-dimethylsiloxane copolymers according to the present invention have the following general formula

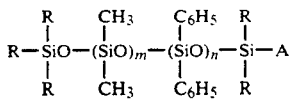

or, the following general formula

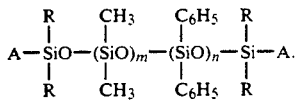

They thus contain at least one organofunctional group at the molecular chain terminals. R in the preceding formulas represents monovalent hydrocarbon groups, for example, alkyl groups such as methyl, ethyl, propyl, butyl, and pentyl; alkenyl groups such as vinyl, allyl, and butenyl; and aryl groups such as phenyl and tolyl. A represents an organofunctional group selected from the group comprising the amino group, epoxy group, carboxyl group, and hydroxyl group, wherein in each case, they are bonded to the silicon atom with a divalent organic group. This organofunctional group is specifically exemplified by the amino group, e.g., the amino group itself as well as the dimethylamino group, diethylamino group, and aminoethylamino group; by epoxy groups such as glycidoxy and 3,4-epoxycyclohexyl; and by the carboxyl group and hydroxyl group. The divalent organic group is exemplified by alkylene groups such as ethylene, propylene, and butylene, and by alkyleneoxyalkylene groups such as ethyleneoxyethylene, ethyleneoxypropylene, and propyleneoxypropylene.

The subscripts m and n in the preceding formulas comprise positive numbers that provide a number-average molecular weight for the copolymers of 500 to 100,000. When the number-average molecular weight falls below 500, the diphenylsiloxane-dimethylsiloxane copolymers according to the present invention provide an unsatisfactory effect in their application as organic resin modifiers. The reactivity with organic resin monomer declines when the number-average molecular weight exceeds 100,000.

The reaction steps in the preparative method according to the present invention are explained in detail below.

The reaction step (I) comprises contacting a polymerization initiator (i) with (ii) a mixture of hexamethylcyclotrisiloxane and hexaphenylcyclotrisiloxane in an aprotic organic solvent to form a first copolymer.

The aprotic organic solvent, is exemplified by aromatics such as benzene, toluene, and xylene; ethers such as tetrahydrofuran and diethyl ether; aliphatics such as hexane and heptane; ketones such as acetone and methyl ethyl ketone; esters such as ethyl acetate and butyl acetate; as well as dimethylformamide, dimethyl sulfoxide, and hexamethylphosphoramide. These may be used in mixtures of two or more. For example, in the case of the use of a weakly polar organic solvent such as toluene, excellent effects are obtained from the addition of a highly polar organic solvent, for example, dimethylformamide, dimethyl sulfoxide, or hexamethylphosphoramide, for the purpose of accelerating the reaction.

Component (i) is a polymerization initiator for the present invention. It is an organolithium compound. The organolithium compound is exemplified by n-butyllithium, methyllithium, and phenyllithium. n-Butyllithium and methyllithium are preferred based on economics and ease of acquisition, and n-butyllithium is most preferred. The lithium silanolate is exemplified by lithium trimethylsilanolate, lithium dimethylvinylsilanolate, lithium triphenylsilanolate, alpha,omega-lithioxydimethylsiloxane, and alpha,omega-lithioxydiphenylsiloxane. Methods for the preparation of these lithium silanolates are known. They are readily prepared by the reaction of organosilanols or silanol-containing organopolysiloxanes with lithium metal or lithium hydroxide or alkyllithium.

Component (i) should be present in sufficient quantity to bring about the polymerization reaction of component (ii). While its addition is not particularly restricted, in specific terms it should be added so as to give values of 100:0 to 0.1:100 for the ratio of the number of moles of lithium in component (i) to the number of moles of silanol groups in the mixture, and this ratio preferably falls within the range of 0.5:99.5 to 100:0.

The molecular-weight regulator, is exemplified by silanol-containing organosilanes, silanol-containing organopolysiloxanes, and water. They can be prepared as a mixture of polymerization initiator component (i) and the molecular-weight regulator by carrying out the preparative reaction for the polymerization initiator component (i), using fewer moles of lithium metal compound than moles of silanol groups in the silane or organopolysiloxane. The number-average molecular weight of the diphenylsiloxane-dimethylsiloxane copolymer afforded by the polymerization reaction under consideration can be freely regulated through the ratio between the total number of moles of polymerization initiator component (i) and terminal groups in the molecular-weight regulator and the total number of moles of monomer consumed.

The main starting material for component (ii) is hexamethylcyclotrisiloxane and hexaphenylcyclotrisiloxane. While the ratio between them is not specifically restricted, the presence of hexaphenylcyclotrisiloxane in large proportions leads to an increase in the quantities of unreacted hexaphenylcyclotrisiloxane and cyclics generated by secondary reactions. As a result, the composition of the diphenylsiloxane-dimethylsiloxane copolymer product will not match the quantities charged, and the yield is also reduced. It is therefore preferred that component (ii) contain no more than 50 mole % hexaphenylcyclotrisiloxane. However, in order to accrue the effects associated with introduction of the diphenylsiloxane unit, component (ii) preferably contains at least 3 mole % hexaphenylcyclotrisiloxane. In addition, non-component (ii) hexaorganocyclotrisiloxane can also be copolymerized in this reaction. Hexaorganocyclotrisiloxane useable for this purpose is exemplified by 1,3,5-trifluoropropyl-1,3,5-trimethylcyclotrisiloxane, hexakis(trifluoropropyl)cyclotrisiloxane, 1,3,5-trimethyl-1,3,5-triethylcyclotrisiloxane, and hexaethylcyclotrisiloxane.

The polymerization reaction in this first step is preferably run for 1 to 50 hours at a temperature up to the boiling point of the aprotic organic solvent. The polymerization reaction temperature and the polymerization reaction time should be appropriately selected with a view to minimizing the occurrence of redistribution reactions. While the polymerization reaction temperature must not exceed the boiling point of the particular organic solvent used, it preferably does not exceed 60° C. in order to minimize redistribution reactions. However, the polymerization reaction temperature should be at least 20° C. in order to obtain a desirable polymerization reaction rate.

In a preferred method, the conversion in this polymerization reaction is monitored typically through the use of an analytical instrument such as a gas chromatograph, gel permeation chromatograph, and the like, and the polymerization reaction is stopped by a neutralization step when the particular desired conversion has been reached. Preferred conversions fall within the range of 80 to 100% and particularly preferred conversions fall within the range of 90 to 100%. When the polymerization reaction is continued after the conversion has reached 100%, the molecular weight distribution of the diphenylsiloxane-dimethylsiloxane copolymer product is broadened due to the occurrence of redistribution reactions, and the quantity of cyclic by-products also increases. Accordingly, when the conversion has reached 100%, it will be necessary to promptly halt the polymerization reaction by a neutralization step. The neutralizing agent employed to stop the polymerization reaction can be, for example, the diorganohalosilane comprising component (iii) or an acid that reacts with the lithium silanolate to form a stable lithium salt. This acid is exemplified by mineral acids such as carbonic acid, hydrochloric acid, and sulfuric acid and by carboxylic acids such as acetic acid, propionic acid, and acrylic acid. In the case of neutralization by acid, the silanol group will appear at the molecular chain terminal(s) of the resulting diphenylsiloxane-dimethylsiloxane copolymers. Component (iii) is exemplified by dimethylchlorosilane, diethylchlorosilane, phenyldimethylchlorosilane, and the like. The second-step reaction can be run simultaneously when the neutralizing agent is component (iii).

In step (II), a condensation reaction is run between diorganohydridohalosilane comprising component (iii) and the product from the above-described polymerization reaction.

When an acid neutralization is carried out in the first-step reaction, the product is diphenylsiloxane-dimethylsiloxane copolymer bearing the silanol group at the molecular chain terminal(s). In the second-step reaction, diorganohalosilane component (iii) is added to this particular product in order thereby to introduce the silicon-bonded hydrogen atom at the molecular chain terminal(s) of the diphenylsiloxane-dimethylsiloxane copolymer through a dehydrohalogenation reaction. The use of a hydrogen halide scavenger in this condensation reaction is recommended, for example, an amine. Component (iii) is exemplified by dimethylchlorosilane, dimethylbromosilane, diethylchlorosilane, and phenylmethylchlorosilane.

In step (III), the product from this condensation reaction is addition-reacted, in the presence of a hydrosilylation catalyst, with (iv) an aliphatically unsaturated compound that contains an organofunctional group selected from the group comprising the amino group, epoxy group, carboxyl group, and hydroxyl group.

Component (iv) comprises the aforesaid aliphatically unsaturated compound that contains an organofunctional group selected from the set comprising the amino group, epoxy group, carboxyl group, and hydroxyl group. This component is specifically exemplified as follows: amino-containing aliphatically unsaturated compounds such as allylamine, cyclohexylallylamine, propylallylamine, and aminoethylallylamine, and these compounds whose active hydrogen has been replaced by the triorganosilyl group, e.g., trimethylsilylallylamine, trimethylsilylcyclohexylallylamine, and trimethylsilylpropylallylamine; epoxy-containing aliphatically unsaturated compounds such as glycidoxy vinyl ether and 3,4-epoxycyclohexylethene; carboxyl-containing aliphatically unsaturated compounds such as 3-butenoic acid and 9-decenoic acid, and these compounds whose active hydrogen has been replaced by the triorganosilyl group, e.g., trimethylsilyl 3-butenoate and trimethylsilyl 9-decenoate; and hydroxyl-containing aliphatically unsaturated compounds such as allyl alcohol, isobutenol, and allylphenol, and these compounds whose active hydrogen has been replaced by the triorganosilyl group, e.g., trimethylsilyl allyl ether and trimethylsilyl isobutenyl ether.

In step (III) between the product from the above-described condensation reaction and the aliphatically unsaturated compound comprising component (iv), the latter should be used in at least an equimolar quantity relative to the former. The diphenylsiloxane-dimethylsiloxane copolymer according to the present invention can be purified by distilling off unreacted component (iv) and low-boiling components by heating in vacuo. When component (iv) is an amino-containing, carboxyl-containing, or hydroxyl-containing aliphatically unsaturated compound, it is preferred that its active hydrogen be preliminarily substituted by the triorganosilyl group. In this case, after running the third-step addition reaction and vacuum distillation of unreacted component (iv) and low boilers, a de-triorganosilylation reaction is then run and the low boilers are again distilled off by heating in vacuo. Triorganosilyl groups useable for this purpose are exemplified by trimethylsilyl, triethylsilyl, phenyldimethylsilyl, and tert-butyldimethylsilyl. The trimethylsilyl group is preferred for its ease of acquisition and high reactivity in the de-triorganosilylation reaction. This de-triorganosilylation reaction is readily run as an hydrolysis or alcoholysis, but methanolysis is preferred for the associated high reaction selectivity and ease of separation and purification. When the organofunctional group in component (iv) is the amino or carboxyl group, the methanol-based de-triorganosilylation reaction runs readily even at room temperature, but heating to temperatures of approximately 50° C. is preferred in order to increase the reaction rate and bring the reaction to completion. Since the de-triorganosilylation reaction is an equilibrium reaction when the organofunctional group in component (iv) is the hydroxyl group, this reaction is preferably run using a catalyst while shifting the equilibrium to the product side through the introduction of a large excess of methanol with heating and by distilling the trimethylmethoxysilane by-product from the system. The catalyst is exemplified by organic acids such as acetic acid and propionic acid; by inorganic acids such as carbonic acid, hydrochloric acid, and sulfuric acid; by inorganic bases such as sodium hydroxide, potassium hydroxide, and lithium hydroxide; and by amines such as triethylamine, pyridine, and quinoline. Among these catalysts, carboxylic acids are preferred for their high catalytic activity and ease of removal from the system by distillation after termination of the reaction and because they are largely free of siloxane chain scission reactions. Acetic acid and propionic acid are particularly preferred.

The hydrosilylation-reaction catalyst employed in the addition reaction in step (III) preferably comprises, for example, a Group VIII transition metal complex catalyst, and platinum-type catalysts are preferred in particular. Said platinum-type catalysts are exemplified by the alcohol solutions of chloroplatinic acid, olefin/platinum complexes, platinum/vinylsiloxane complexes, and the like. This addition reaction can be run in the absence of solvent, but is preferably run in the presence of a suitable solvent, as exemplified by aromatics such as benzene, toluene, and xylene; aliphatics such as hexane and heptane; ethers such as tetrahydrofuran and diethyl ether; ketones such as acetone and methyl ethyl ketone; esters such as ethyl acetate and butyl acetate; chlorinated hydrocarbons such as carbon tetrachloride, trichloroethane, and chloroform; as well as dimethylformamide, dimethyl sulfoxide, and the like. The addition reaction under consideration can be run even at room temperature, but a consideration of the addition-reaction rate makes it advantageous to run this reaction generally at temperatures of approximately 50° to 200° C.

The diphenylsiloxane-dimethylsiloxane copolymers according to the present invention as described hereinbefore contain both reactive organofunctional groups as well as the phenyl group which has a high affinity for organic resins. As a consequence of these attributes, this copolymer is useful as a modifier for organic resins in that, through its copolymerization with various types of organic resin monomer, it imparts the properties associated with organopolysiloxanes to the resulting organic resin.

EXAMPLES

The present invention is explained in greater detail below through reference and illustrative examples.

Reference Example 1

Dimethyloligosiloxane (38.06 g, 125.45 mmol) with the following general formula was charged to a four-neck flask and cooled to below 10° C. with ice water.

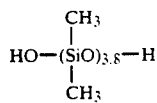

While stirring under a dry nitrogen blanket, 10.12 mmol n-butyllithium was introduced as its n-hexane solution. The following were introduced immediately after addition of the n-butyllithium: 319.5 g (1436.05 mmol) hexamethylcyclotrisiloxane, 125.37 g (211.08 mmol) hexaphenylcyclotrisiloxane, and 400 g tetrahydrofuran. After stirring for 5 hours with heating at 40° C., the hexamethylcyclotrisiloxane conversion was determined to be 99% by gas chromatography (GLC). The polymerization was then stopped by the addition of 46.06 g triethylamine and 28.71 g (303.48 mmol) dimethylchlorosilane. The product was recovered by filtration and then solvent removal in vacuo. This product was confirmed to be diphenylsiloxane-dimethylsiloxane copolymer with the following average formula by gel permeation chromatography (GPC), nuclear magnetic resonance analysis (NMR), infrared spectrochemical analysis (IR), and iodometric determination of the weight % of silicon-bonded hydrogen. A yield of 96% and a dispersivity of 1.28 was determined for this diphenylsiloxane-dimethylsiloxane copolymer by GPC. The measured value for the % SiH was 0.051%, while the calculated value was 0.049%.

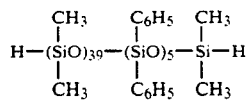

This diphenylsiloxane-dimethylsiloxane copolymer was designated as CP-1.

Reference Example 2

The following were introduced into a four-neck flask and cooled to below 10° C. with ice water: 263.1 g (1128.67 mmol) hexamethylcyclotrisiloxane, 200.55 g (1011.37 mmol) hexaphenylcyclotrisiloxane, and 400 g tetrahydrofuran. This was followed by the introduction of 126.45 mmol n-butyllithium as its n-hexane solution with stirring under a dry nitrogen blanket. After stirring for 6.5 hours with heating at 40° C., the hexamethylcyclotrisiloxane conversion was determined to be 99% by GLC. The polymerization was then stopped by the addition of 5.13 g triethylamine (50.7 mmol) and 14.36 g (151.8 mmol) dimethylchlorosilane. Polymer was recovered by filtration and then solvent removal in vacuo. This polymer was confirmed to be diphenylsiloxane-dimethylsiloxane copolymer with the following average formula by GPC, NMR, IR, and iodometric determination of the weight % of silicon-bonded hydrogen. A yield of 96% and a dispersivity of 1.39 was determined for this diphenylsiloxane-dimethylsiloxane copolymer by GPC. The measured value for the %SiH was 0.030%, while the calculated value was 0.027%.

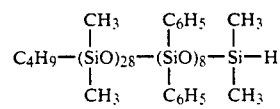

This diphenylsiloxane-dimethylsiloxane copolymer was designated as CP-2.

EXAMPLE 1

The following were combined: 40 g of the CP-1 (silicon-bonded hydrogen: 19.1 meq) prepared in Reference Example 1, 2.95 g (22.85 mmol) trimethylsilylallylamine, and sufficient Pt/tetramethyldivinyldisiloxane complex to provide 20 ppm platinum metal referred to the total of the first two reagents. After heating for 2 hours at 100° C., a sample was taken and submitted to infrared spectrochemical analysis: the absorption characteristic of silicon-bonded hydrogen had disappeared. The low boilers were distilled off by heating in vacuo to afford a transparent liquid. This was confirmed by NMR and IR to be diphenylsiloxane-dimethylsiloxane copolymer with the following average formula.

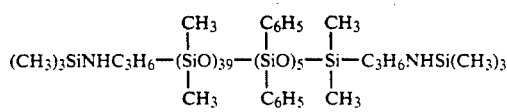

This organopolysiloxane (42 g) was stirred for one hour at 50° C. with 12.2 g methanol. The low boilers were distilled off by heating in vacuo to afford a transparent liquid. This was confirmed to be diphenylsiloxane-dimethylsiloxane copolymer with the following average formula by NMR and IR and measurement of the weight % amine group. The % amine was measured at 0.67%, while its calculated value was 0.79%.

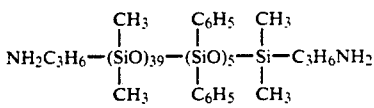

EXAMPLE 2

The following were combined: 40 g of the CP-1 (silicon-bonded hydrogen: 19.1 meq) prepared in Reference Example 1, 2.61 g (22.85 mmol) allyl glycidyl ether, and sufficient Pt/tetramethyldivinyldisiloxane complex to provide 20 ppm platinum metal referred to the total of the first two reagents. After heating for 1 hour at 90° to 100° C., a sample was taken and submitted to analysis by IR: the absorption characteristic of silicon-bonded hydrogen had disappeared. The low boilers were distilled off by heating in vacuo to afford a transparent liquid. This was confirmed by NMR, IR, GPC, and determination of the weight % epoxy to be diphenylsiloxane-dimethylsiloxane copolymer with the following average formula. The %epoxy was measured at 1.72%, while its calculated value was 1.96%.

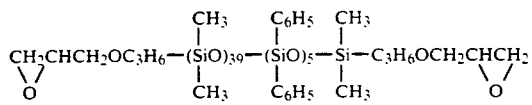

EXAMPLE 3

The following were combined: 40 g of the CP-1 (silicon-bonded hydrogen: 19.1 meq) prepared in Reference Example 1, 5.37 g (20.95 mmol) trimethylsilyl undecenoate, and sufficient Pt/tetramethyldivinyldisiloxane complex to provide 20 ppm platinum metal referred to the total of the first two reagents. After heating for 2 hours at 90° to 100° C., a sample was taken and submitted to analysis by IR: the absorption characteristic of silicon-bonded hydrogen had disappeared. The low boilers were distilled off by heating in vacuo to afford a transparent liquid. This was confirmed by NMR, IR, and GPC to be diphenylsiloxane-dimethylsiloxane copolymer with the following average formula.

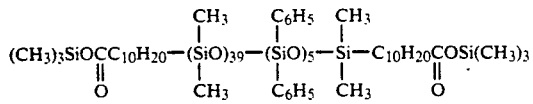

This organopolysiloxane (44 g) was stirred for one hour at 50° C. with 13.4 g methanol. The low boilers were distilled off by heating in vacuo to afford a transparent liquid. This was confirmed by NMR, IR, and GPC to be diphenylsiloxane-dimethylsiloxane copolymer with the following average formula.

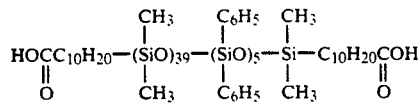

EXAMPLE 4

The following were combined: 40 g of the CP-1 (silicon-bonded hydrogen: 19.1 meq) prepared in Reference Example 1, 2.97 g (22.86 mmol) trimethylallyloxysilane, and sufficient Pt/tetramethyldivinyldisiloxane complex to provide 20 ppm platinum metal referred to the total of the first two reagents. After heating for 2 hours at 90° to 100° C., a sample was taken and submitted to analysis by IR: the absorption characteristic of silicon-bonded hydrogen had disappeared. The low boilers were distilled off by heating in vacuo to afford a transparent liquid. This was confirmed by NMR, IR, and GPC to be diphenylsiloxane-dimethylsiloxane copolymer with the following average formula.

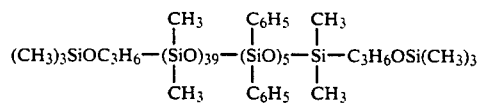

This organopolysiloxane (42 g) was mixed with 40 g methanol and 0.35 g acetic acid, and the mixture was heated at ambient pressure while distilling off the trimethylmethoxysilane by-product. Heating was discontinued when the temperature of the reaction mixture reached 80° C., and it was returned to ambient temperature by water cooling. The low boilers were then distilled off by heating in vacuo to afford a transparent liquid. This was confirmed by NMR, IR, GPC, and determination of the weight % hydroxyl group to be diphenylsiloxanedimethylsiloxane copolymer with the following structural formula. The %hydroxyl was measured at 0.70%, while its calculated value was 0.79%.

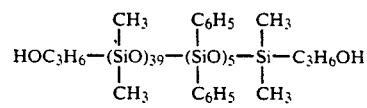

EXAMPLE 5

Diphenylsiloxane-dimethylsiloxane copolymer with the average formula given below was prepared as in Example 1 from 40 g CP-2 (silicon-bonded hydrogen: 12.0 meq) prepared in Reference Example 2 and 1.86 g (14.4 mmol) trimethylsilylallylamine. The %amine was measured at 0.40%, while its calculated value was 0.47%.

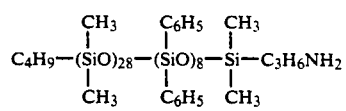

EXAMPLE 6

Diphenylsiloxane-dimethylsiloxane copolymer with the average formula given below was prepared as in Example 2 from 40 g CP-2 (silicon-bonded hydrogen: 12.0 meq) prepared in Reference Example 2 and 1.64 g (14.4 mmol) allyl glycidyl ether. The %epoxy was measured at 1.06%, while its calculated value was 1.25%.

$$C_4H_9-(SiO)_{28}-(SiO)_8-\underset{\underset{CH_3}{|}}{\overset{\overset{CH_3}{|}}{Si}}-C_3H_6OCH_2CHCH_2$$
$$\overset{CH_3}{\underset{CH_3}{}} \quad \overset{C_6H_5}{\underset{C_6H_5}{}} \quad \overset{CH_3}{\underset{CH_3}{}} \quad \overset{}{\underset{O}{\diagdown\diagup}}$$

EXAMPLE 7

Diphenylsiloxane-dimethylsiloxane copolymer with the average formula given below was prepared as in Example 3 from 40 g CP-2 (silicon-bonded hydrogen: 12.0 meq) prepared in Reference Example 2 and 3.7 g (14.4 mmol) trimethylsilyl undecenoate.

$$C_4H_9-(SiO)_{28}-(SiO)_8-Si-C_{10}H_{20}COOH$$

with CH$_3$, C$_6$H$_5$, CH$_3$ substituents.

EXAMPLE 8

Diphenylsiloxane-dimethylsiloxane copolymer with the average formula given below was prepared as in Example 4 from 40 g CP-2 (silicon-bonded hydrogen: 12.0 meq) prepared in Reference Example 2 and 1.87 g (14.4 mmol) allyloxytrimethylsilane. The %hydroxyl was measured at 0.59%, while its calculated value was 0.50%.

$$C_4H_9-(SiO)_{28}-(SiO)_8-Si-C_3H_6OH$$

with CH$_3$, C$_6$H$_5$, CH$_3$ substituents.

The diphenylsiloxane-dimethylsiloxane copolymer according to the present invention is a novel compound that has at least one organofunctional group at its molecular chain terminals. The preparative method according to the present invention characteristically affords this novel diphenylsiloxane-dimethylsiloxane copolymer in good yields under mild conditions.

BRIEF DESCRIPTION OF THE DRAWINGS

FIG. 1 is an infrared absorption spectrogram of the diphenylsiloxane-dimethylsiloxane copolymer prepared in Example 1.

FIG. 2 is an infrared absorption spectrogram of the diphenylsiloxane-dimethylsiloxane copolymer prepared in Example 2.

FIG. 3 is an infrared absorption spectrogram of the diphenylsiloxane-dimethylsiloxane copolymer prepared in Example 3.

FIG. 4 is an infrared absorption spectrogram of the diphenylsiloxane-dimethylsiloxane copolymer prepared in Example 4.

Figure 1:
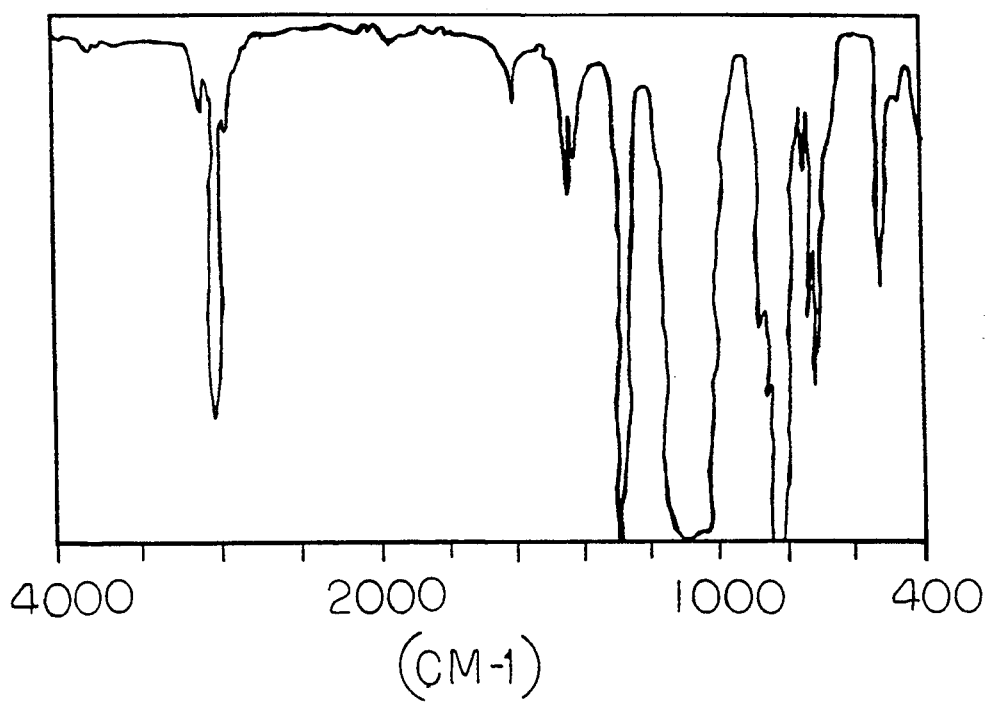
FIG. 1
Figure 2:
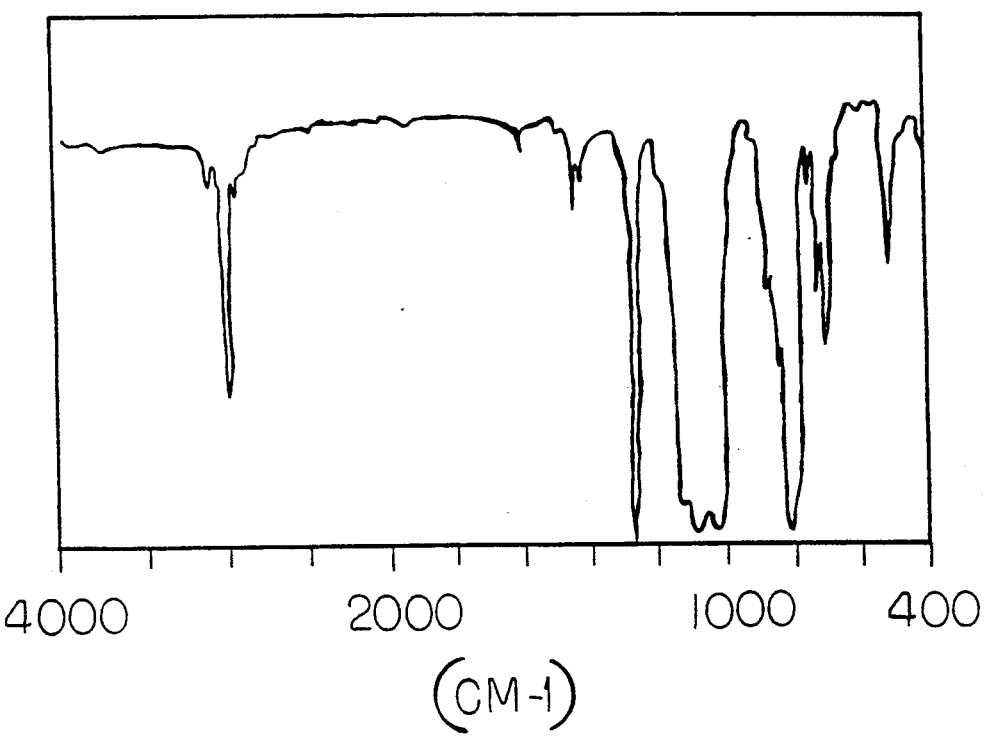
FIG. 2
Figure 3:
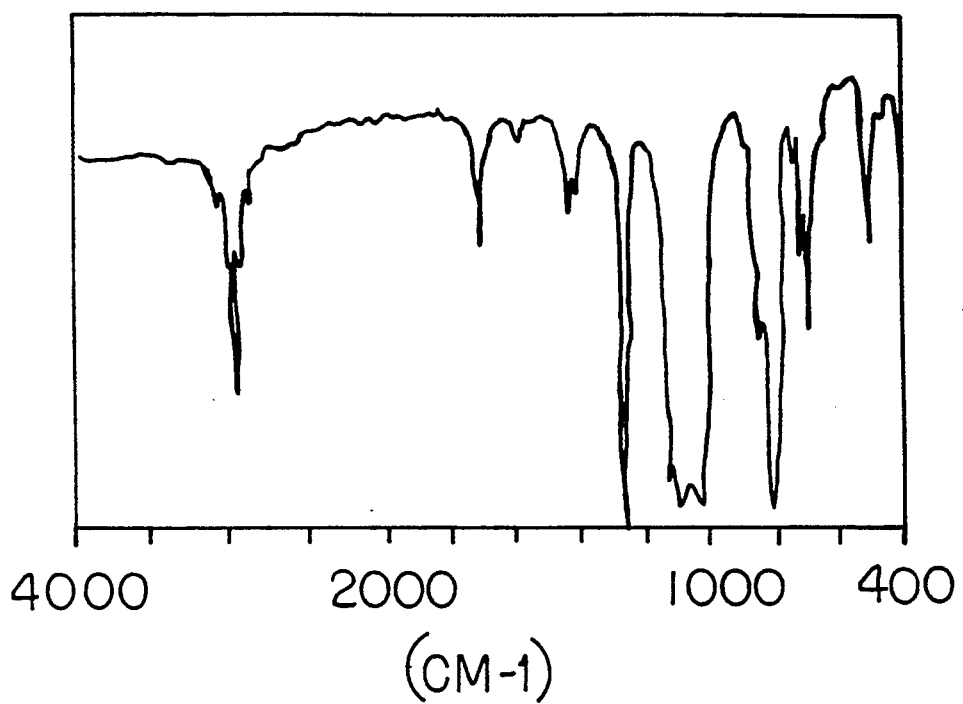
FIG. 3
Figure 4:
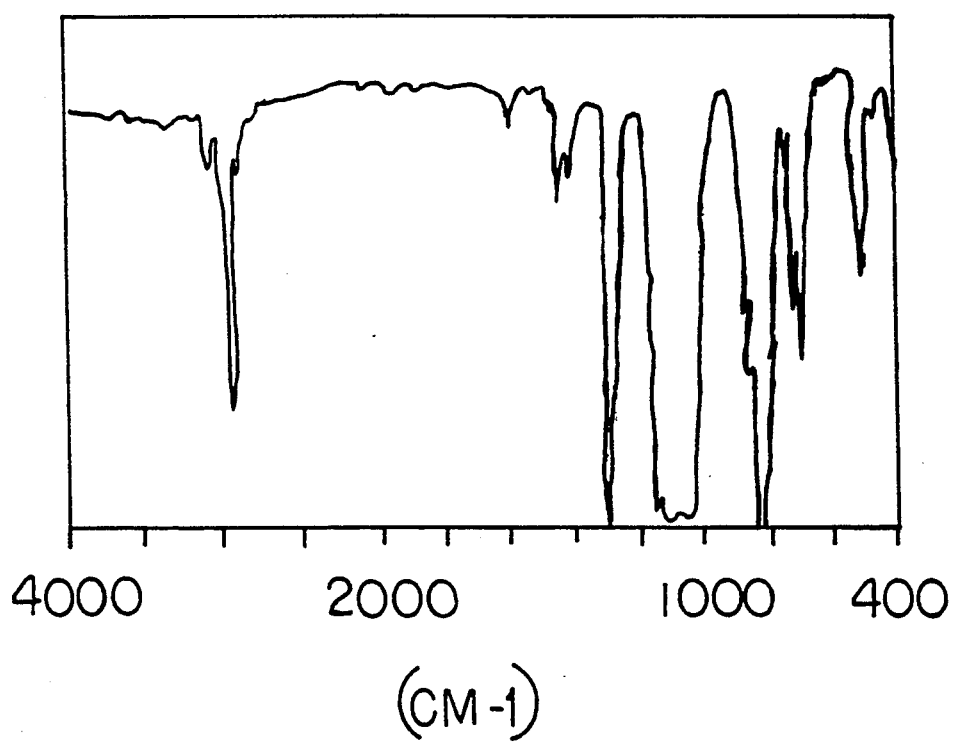
FIG. 4

That which is claimed:

1. A diphenylsiloxane-dimethylsiloxane copolymers selected from a group consisting essentially of copolymers having the following general formula $$RSiO(SiO)_m(SiO)_nSiA \quad A.$$

with R, CH$_3$, C$_6$H$_5$, R substituents top and R, CH$_3$, C$_6$H$_5$, R bottom; and $$ASiO(SiO)_m(SiO)_nSiA \quad B.$$

with R, CH$_3$, C$_6$H$_5$, R substituents top and R, CH$_3$, C$_6$H$_5$, R bottom wherein R is a monovalent hydrocarbon group;

A is an organofunctional group selected from the group comprising the aminoalkyl, epoxy, carboxyl and hydroxyl groups, wherein such groups are bonded to silicon atoms through a divalent organic radical;

m and n are both positive numbers such that they give a number-average molecular weight for the copolymers in the range of 500 to 100,000.

2. A method for the preparation of the diphenylsiloxane-methylsiloxane copolymers of claim 1 wherein said method comprises (I) contacting a polymerization initiator (i) with (ii) a mixture of hexamethylcyclotrisiloxane and hexaphenylcyclotrisiloxane in an aprotic organic solvent to form a first copolymer;

(II) contacting the copolymer from (I) with a (iii) a diorganohydridohalosilane to form a silicon hydride-modified copolymer;

(III) reacting the modified copolymer from (II) with (iv) an aliphatically unsaturated compound that contains an organofunctional group selected from the group comprising the aminoalkyl, epoxy, carboxyl and hydroxyl groups in the presence of a hydrosilylation catalyst, and (IV) recovering the diphenylsiloxane-methylsiloxane copolymers.

* * * * *